Feb. 27, 1940.  E. GODAT  2,191,711
WEIGHING APPARATUS
Filed Dec. 15, 1936
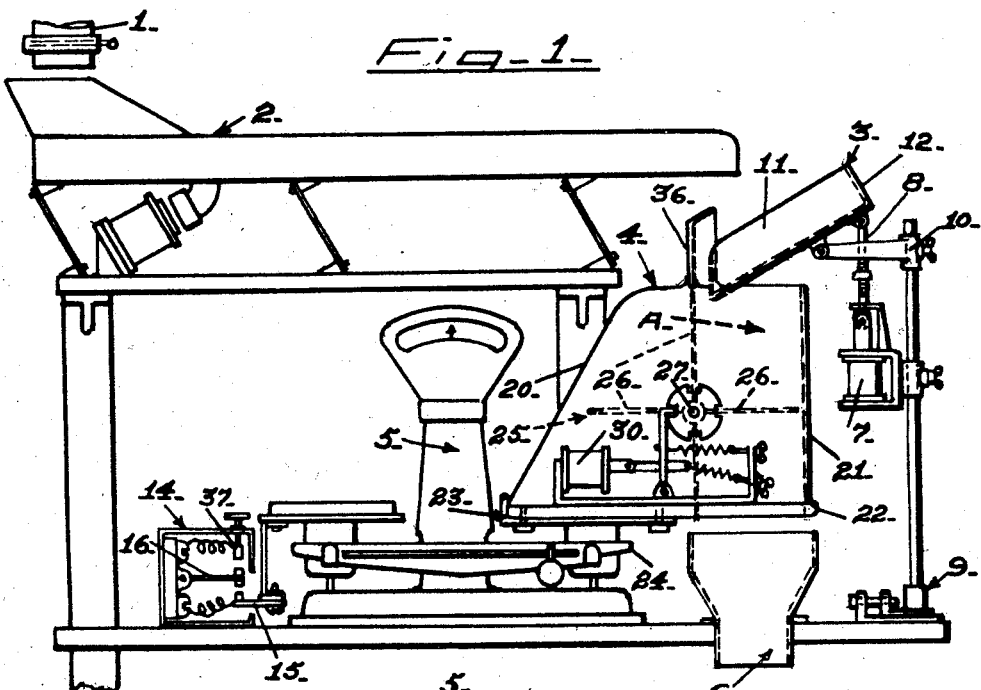
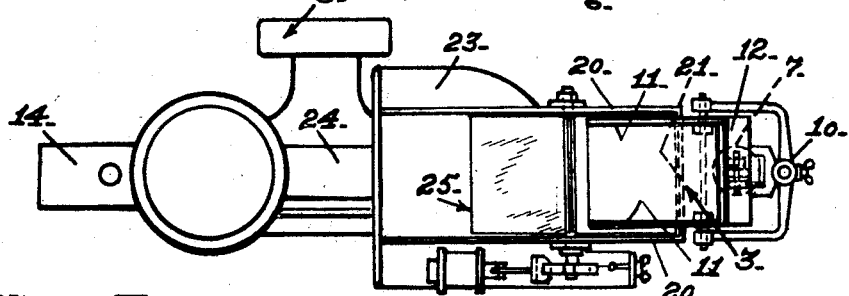
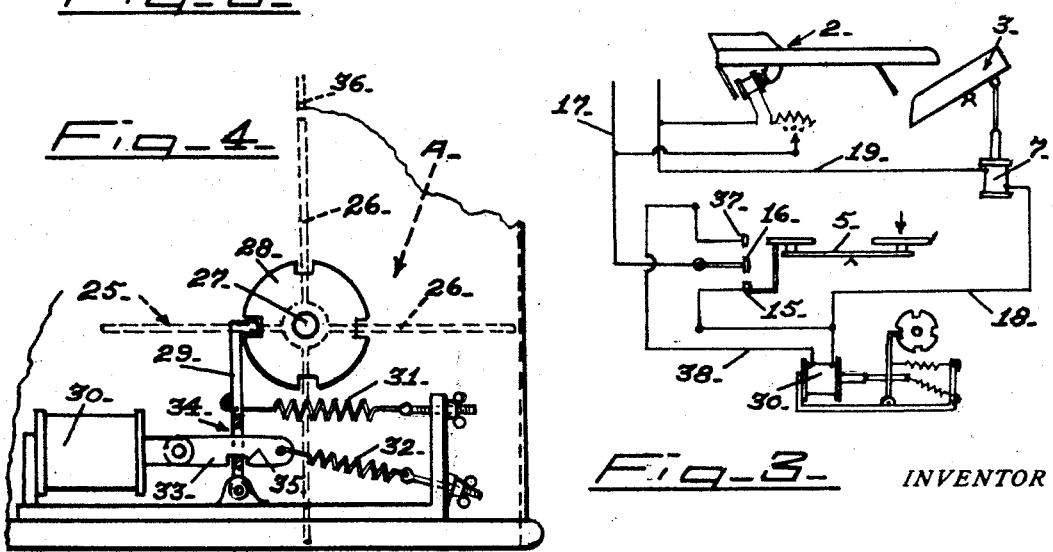
INVENTOR
Edmond Godat Patented Feb. 27, 1940

2,191,711

UNITED STATES PATENT OFFICE 2,191,711

WEIGHING APPARATUS

Edmond Godat, Los Angeles, Calif.

Application December 15, 1936, Serial No. 115,963

3 Claims. (Cl. 249—19)

This invention relates to and has for an object the provision of an apparatus for weighing beans, rice and like materials in separate batches of uniform weight and subject to being readily packaged while a continuous stream of such material is fed to the apparatus; whereby large quantities of such materials may be put up in packages of uniform weight or otherwise segregated in batches of given accurate weight with speed and accuracy.

An important object of the invention is to provide apparatus of the character described having means to not only facilitate a continuously rapid flow of the material to a weighing means, which will separate the material into batches of uniform given weight, but also for automatically retarding said flow when a batch of said material collected in said weighing means approaches the predetermined weight of said given batches.

A further object is to provide weighing apparatus of the character described wherein beans, rice, or like commodities will be continuously gravitated from a feed means onto a tiltable feed chute which facilitate a continuous feed to, weighing means which collects a batch of said material up to a predetermined weight and then automatically discharge said batch in such manner as to facilitate packing or sacking thereof; there being means controlled by said weighing means which will retard the flow of material from said chute each time that a batch of said material in said weighing means reaches a given weight less than the full predetermined weight of a complete batch, whereby to insure weight accuracy in determining the said batches of material.

Another object is to provide weighing apparatus wherein a variably tiltable feed chute will provide for a continuous flow of material to the weighing means and will be tilted to retard said flow by the automatic operation of a tilting means controlled by the weight of the material in the weighing means.

With the above and other objects in view the invention consists in the novel construction and combination of parts hereinafter described, illustrated in the accompanying drawing, and set forth in the claims hereto appended, it being understood that various changes in form, proportion, size and minor details of construction within the scope of the claims may be resorted to without departing from the spirit or sacrificing any of the advantages of the invention.

Referring to the drawing:

Figure 1 is a front elevation of the weighing apparatus of this invention.

Figure 2 is a top plan view of said apparatus.

Figure 3 is a diagram of the apparatus and its electrical circuits.

Figure 4 is an enlarged elevation of a detail of the invention related to the discharging of the material from the weighing means.

One embodiment of this invention as shown in the accompanying drawing comprises a valved feed line 1 for discharging beans, rice or like material from a large supply, not shown, into a vibratory feed means 2 which in turn continuously and evenly deposits said material onto a tiltable feed chute 3. This chute is arranged so that it will provide for a continuous and an effectively controlled flow of said material to the weighing means 4 of the scale 5. This weighing means will function to repeatedly separate the material flowing thereto into batches and will automatically discharge the batches when they reach a predetermined weight. Another chute 6 disposed as here shown to receive the material from the weighing means will facilitate "bagging" or sacking of the batches.

To insure accurate weighing operations and the segregation of batches of uniform weight, I provide a means controlled by the weight of the material collected in the weighing means for automatically tilting the chute 3 so as to decrease the inclination of said chute and retard the flow therefrom when a batch of said material being collected in the weighing means nearly approaches the intended weight of the batch. For example; if the weighing means and scales are set to provide one pound batches; then, when all but fractional portions of an ounce of the material are required to give the batch said one pound weight, the otherwise rapid flow of the material into said weighing means will be retarded so that said batch will, by means of this regulatable minimized flow, build up to the full weight and thereby accuracy of the weighing operation is assured. As here shown the tiltable chute 3 is tilted by means of a solenoid 7 connected with said chute by a link 8. This solenoid is vertically adjustably supported on a laterally adjustably mounted standard 9. The bracket 10 vertically adjustably mounted on the standard 9 tiltably supports, on its outer end, the chute 3. These adjustments permit of the setting of the chute at the various clearance and inclination positions required to alternately effect a rapid "full" flow and a momentarily retarded and accumulated flow of various materials having different characteristics as to size, form and constituency with correspondingly respective angles of repose.

It is apparent that when the solenoid 7 is energized it will move the chute 3 to decrease the inclination thereof and thereby retard the flow of material therefrom and that upon deenergization of said solenoid the chute will gravitate back to its normally fully inclined position. As here shown the chute has side and end walls 11 and 12 which prevent loss of the material gravitating thereon from the feed means 2.

Control of the solenoid 7 is effected by a scale operated circuit closing means 14 set so that when a given weight of material is contained in the weighing means 4, said given weight being under that intended in the batch, a scale carried contact member 15 will be engaged with the adjustable contact 16. This closes the circuit for the solenoid thru conductor 17, contacts 16 and 15, conductor 18, the solenoid and conductor 19.

The weighing means 4 associated with the scale 5, as here shown, comprises an enclosure having opposed side wall 20 and an end wall 21 fixed in upright position on an extension 22 from one of the weighing platforms or tables 23 on the scale beam 24.

Within this enclosure is a four bladed wheel 25 the blades or vanes 26 of which define, with said side and end walls, a weighing container A in the upper part of said enclosure each time two blades are positioned vertically and horizontally between said walls as shown in Figure 1.

One of the trunnions 27 of the wheel 25 has a notched disc 28 thereon in the notches of which a detent member 29 is adapted to engage to hold the blades or vanes 26 in position to form one upright wall and the bottom of the container A. The detent 29 is pivoted so that it may be moved into and out of operative position by a solenoid 30, there being springs 31 and 32 for controlling the operation of the detent and said solenoid. On the solenoid is a pivoted member 33 extended thru an aperture 34 in the detent and having a notch 35 to engage said lower marginal portion of said aperture whereby when the solenoid is energized the pull on the member 33 will retract the detent and release the wheel 25. The springs 31 and 32 will return the detent and solenoid member 33 to normal position when the solenoid is deenergized thereby the detent will lock the wheel 25 in position to again form the container A.

It will be noted that the wheel 25 will be turned immediately, by the weight of the material on the vane 26 forming the bottom of the container, when the detent 29 releases said wheel and consequently the material is dumped therefrom into the chute 6 while the other vanes 26 turn into position to again form the container A. It will be seen that the side walls 20 support a shield or guard 36 which serves as a continuation of the uppermost vane 26 to prevent spilling or waste of the material gravitating into the container A from the tiltable chute 3.

It is necessary that the solenoid 30 be energized when the material collecting in the container A is at the predetermined weight of a complete batch thereof and this is accomplished by the circuit closer 14. It is seen that after contacts 15 and 16 are engaged, further upward movement of the contact 15 will be caused as the scale beam rocks under the influence of the weight of the material added after said contacts have first engaged. This movement of contact 15 lifts contact 16 so that it will engage a contact 37. This will close the circuit for the solenoid 30, thru conductors 19, 18, solenoid 30, conductor 38, contacts 37 and 16 and conductor 17.

It will now be seen that with the apparatus of this invention a continuous and even feed of beans, rice, or the like, will take place between the means 2 and tiltable chute 3 which will cause the flow of material to be directed into the measuring container A, there being no appreciable interruption by the chute 3 of the steady flow of material and said chute enhances this steady flow by reason of its position between the feed means 2 and weighing means 4 and the inclination thereof. However when a predetermined amount of the material, less than that to be contained in a contemplated batch, is collected in the container A; for example, a fraction of an ounce less than the anticipated weight of a full batch, the circuit closer 14 will be operated by the scale whereby to energize the solenoid 7 and thereby tilt the chute 3 so as to reduce the inclination thereof and thereby momentarily retard the flow of the material during the remainder of the operation of feeding material in sufficient amount to bring the batch of material up to the predetermined weight. When this predetermined weight is achieved the circuit closer 14 operates as hereinbefore stated, to close the circuit for the solenoid 30 which then withdraws the detent 29 from the wheel 25. The weight of the material or the vane 26 which forms the bottom wall of the container A will cause said wheel to rotate and the contents of said container will slide out into the chute 6 where the "sacking" or packing of the material in batches of uniform weight is readily facilitated.

It should be noted that the solenoids 7 and 30 will become deenergized when the material is discharged from the container A, and the scale 5 retracts the contact 15 of scale operated circuit closer 14. During the rotation of the wheel 25 and during the discharge of the material therefrom, the solenoid 7 maintains the chute 3 tilted so as to retard the flow of material therefrom but immediately that the container A is again formed in the weighing means 4, the solenoid 7 will become deenergized and the chute 2 will drop back into position to cause a continuous and even flow of material whereby to repeat the weighing and segregating operation.

It is important to note that the initial movement of the wheel 25 under influence of the weight of the material thereon will dispose the uppermost vane rearwardly of the discharge mouth of the chute 2 which is still in flow retarding position and the "dribble" flow will deposit the material into the next following container A, during the formation of the later.

I claim:

1. In weighing apparatus, a scale, a weighing container supported thereby, a feed chute adjustable for varying the rate of flow of loose material into said container, a support on which said chute is normally gravitationally disposed in a position for effecting a gravitational flow of material into said container, means controlled by said scale and operating automatically when the material in said container attains a predetermined weight, for adjusting said chute and holding it in a postion for reducing but not stopping the flow of additional material into said container and also operating automatically for releasing the chute for gravitational movement into normal position when the material is discharged from said container and means also controlled by said scale and operating automatically responsive to the additional material in said container reaching a predetermined weight for effecting the discharge of the material from said container.

2. In weighing apparatus, a scale, a weighing container supported thereby, a feed chute adjustable for varying the rate of flow of loose material into said container, a support on which said chute is normally gravitationally disposed in a position for effecting a gravitational flow of material into said container, means controlled by said scale and operating automatically when the material in said container attains a predetermined weight, for adjusting said chute and holding it in a position for reducing but not stopping the flow of additional material into said container and also operating automatically for releasing the chute for gravitational movement into normal position when the material is discharged from said container, said container having a plurality of compartments, means supporting said container for gravitational movement, under the weight of said material in a compartment thereof, to successively dispose said compartments in material receiving and material dumping positions, means for normally restraining said container from such movement, and means controlled by said scale for automatically releasing said restraining means when the additional material which has flowed from said chute into said container reaches a predetermined weight.

3. In weighing apparatus, a scale, a weighing container supported thereby, a feed chute adjustable for varying the rate of flow of loose material into said container, a support on which said chute is normally gravitationally disposed in a position for effecting a gravitational flow of material into said container, means controlled by said scale and operating automatically when the material in said container attains a predetermined weight, for adjusting said chute and holding it in a position for reducing but not stopping the flow of additional material into said container and also operating automatically for releasing the chute for gravitational movement into normal position when the material is discharged from said container and means also controlled by said scale and operating automatically when the additional material which has flowed from said chute into said container reaches a predetermined weight for effecting the discharge of the material from said container, said support including a bodily adjustable member on which said chute is pivoted, between its ends, said automatic adjusting means for said chute including a solenoid bodily adjustably mounted on said support and a link connecting said solenoid with said chute.

EDMOND GODAT.